United States Patent [19]

Yamazaki

[11] Patent Number: 4,836,655
[45] Date of Patent: Jun. 6, 1989

[54] FERROELECTRIC LIQUID CRYSTAL DEVICE WITH A CHARGE STORAGE STRUCTURE

[75] Inventor: Shunpei Yamazaki, Tokyo, Japan

[73] Assignee: Semiconductor Energy Laboratory Co., Ltd., Kanagawa, Japan

[21] Appl. No.: 15,787

[22] Filed: Feb. 17, 1987

[30] Foreign Application Priority Data

Feb. 17, 1986 [JP] Japan ................. 61-32365
Feb. 17, 1986 [JP] Japan ................. 61-32366
Feb. 17, 1986 [JP] Japan ................. 61-32367

[51] Int. Cl.$^4$ .............................................. G02F 1/13
[52] U.S. Cl. .................... 350/350 S; 350/334; 350/339 R; 357/23.5
[58] Field of Search ........... 350/334, 350 S, 341, 350/339 R, 342; 357/23.5; 365/114, 108, 115

[56] References Cited

U.S. PATENT DOCUMENTS

| | | | |
|---|---|---|---|
| 3,350,610 | 3/1964 | Akio | 357/23.5 |
| 3,700,306 | 10/1972 | Cartmell et al. | 350/341 |
| 3,878,549 | 4/1975 | Yamazaki | 357/23.5 |
| 4,021,798 | 5/1977 | Kojima et al. | 350/336 X |
| 4,119,840 | 10/1978 | Nelson | 350/342 |
| 4,191,452 | 3/1980 | Grinberg et al. | 350/342 |
| 4,367,924 | 1/1983 | Clark et al. | 350/350 S X |
| 4,431,271 | 2/1984 | Okubo | 350/334 |
| 4,432,610 | 2/1984 | Kobayashi et al. | 350/333 X |
| 4,563,059 | 1/1986 | Clark et al. | 350/350 S |
| 4,582,395 | 4/1986 | Morozumi | 350/334 |
| 4,617,646 | 10/1986 | Yang | 350/350 S |
| 4,719,239 | 3/1982 | Stephens | 350/334 X |

FOREIGN PATENT DOCUMENTS

0182484 5/1986 European Pat. Off. ............ 350/334

OTHER PUBLICATIONS

Beam, "Charge Storage Beam-Addressable Memory", IBM Tech. Disc. Bull., vol. 9, No. 5, Oct. 1966, pp. 555–556.
Gladstone et al, "Liquid Crystal Display Devices", IBM Technical Disc. Bull., vol. 14, No. 5, Oct. 1971, pp. 1472–1473.
Millman et al, *Electronic Devices and Circuits*, pp. 95–99, McGraw-Hill, 1967.
Addy et al., "Addressing a Liquid Crystal Cell", IBM Tech. Disc. Bull., vol. 22, No. 6, Nov. 1979, pp. 2507–2508.

*Primary Examiner*—Stanley D. Miller
*Assistant Examiner*—Richard F. Gallivan
*Attorney, Agent, or Firm*—Gerald J. Ferguson, Jr.

[57] ABSTRACT

An improved liquid crystal device which is driven by applying electric field thereon is shown. The device includes a ferroelectric liquid crystal layer which is separated into pixels and whose optical nature is changed by the electric field induced therein. Contiguous to the liquid crystal layer, a semiconductor charge storage layer is provided to give hysteresis to the device.

14 Claims, 4 Drawing Sheets

FERROELECTRIC LIQUID CRYSTAL DEVICE WITH A CHARGE STORAGE STRUCTURE

BACKGROUND OF THE INVENTION

This invention relates to a liquid crystal device, more particularly relates to a liquid crystal device with a charge storage structure.

Liquid crystal devices have been employed for the displays of microcomputers, word processors, television systems and so forth, because of their high contrast indication ability. On the other hand liquid crystals have been considered promising as competitive media for memory devices such as disc memories and for applications to such audio-instruments as speakers.

In prior art, there have been known such a smectic liquid crystal device which comprises a pair of substrates opposing to each other with a liquid crystal layer therebetween, a pair of electrodes provided on the opposed insides of the substrates and also a pair of oriented films symmetrically provided on the electrodes, where a simple matrix structure or an active element structure is constructed with non-linear devices. A very important characteristic required of such a liquid crystal device is a large coercive electric field Ec (threshold electric field). The large Ec makes it possible to hold the liquid crystal layer at a certain condition, for example, when the electric field applied to the layer is removed. And, when the applied electric field increases to a level beyond the strength, the liquid crystal layer changes abruptly its condition into a transparent condition, and vice versa. In this regard, the coercive electric field Ec takes a positive value Ec+ (a threshold value observed when applied with a positive voltage), and a negative value Ec− (a threshold value observed when applied with a negative voltage). Although Ec+ and Ec− are not necessarily the same, both can be about equal by virtue of a processing condition of an orientation treatment on surfaces contiguous to a liquid crystal layer.

However, such a smectic liquid crystal layer exhibits only a very faint hysterisis, namely, has a very small and unstable Ec. Especially, when a surface stabilized ferroelectric liquid crystal layer is designed, the value of Ec depends largely on the strength of pulsed electric field applied to the layer. Hence, an excitation system known as AC bias method has been employed in which a negative pulse signal is applied in advance of rewriting in a positive direction, and then a positive pulse is applied under a fine control in terms of the strength of electric field and the applying time, and in inverse, when rewriting in a negative direction is desired, procedure is taken in a same manner as the former case where the direction of electric field is reversed. The AC bias method makes a circumferential circuit very complicated.

Accordingly, a need exists to make a liquid crystal device having a circumferential circuit less complicated than that when using as AC bias method. On the other hand, the bias method seems indispensible for implementing a liquid crystal device as long as a liquid crystal layer has only a slight Ec. There have been other attempts to make a liquid crystal layer with a stable Ec. However, they are compromising to its frequency characteristics.

SUMMARY OF THE INVENTION

To solve the above problems, a device according to the invention is provided with a charge storage layer or charge storage clusters in which an electric charge is stored close to a liquid crystal layer without the assistance of an external electric field. The device exhibits an apparent hysteresis due to the charge stored in the charge storage layer in response to the electric field applied to the liquid crystal layer. The charge storage layer is subjected to external electric field in the same manner as the liquid crystal layer and provided with an insulator film which prevents the charge accumulated in the charge storage layer from escaping when the external field is removed. The thickness of the charge storage layer is so chosen as not to absorb incident light beyond 30%.

By virtue of this structure, electric charge is provided to the charge storage layer or clusters through the insulator film. The conductance of the insulator film is such that the transportation is Fowler-Nordheim tunneling in proportion to a power having electric field as the index.

It is therefore an object of the invention to provide a liquid crystal device with a nonvolatile memory function.

It is another object of the invention to provide a liquid crystal device having a certain value of its coercive force in response to the electric field applied thereon.

It is a further object of the invention to provide a liquid crystal device capable of exhibiting an apparent hysteresis.

DETAILED DESCRIPTION OF THE PREFERRED EMBODIMENT

Figure 1:
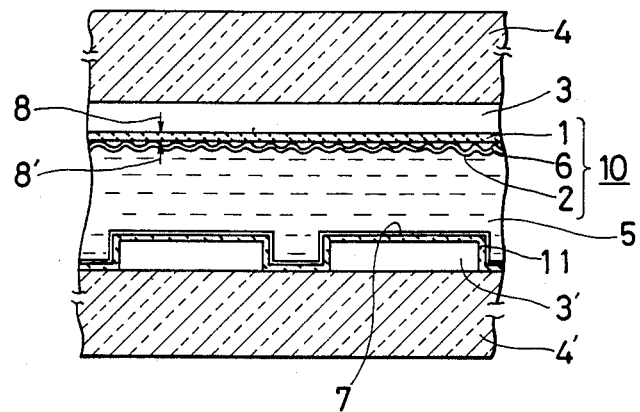
FIG. 1 is a cross sectional view showing an embodiment of the invention.

Referring to FIG. 1, a liquid crystal device according to the invention is illustrated. On the opposed inside surfaces of a pair of transparent substrates 4 and 4' are provided transparent parallel electrode strips 3 extending in the lateral direction of the drawing and transparent parallel electrode strips 3' extending perpendicular to the plane of the drawing. A liquid crystal layer 5 is disposed between the opposed substrates 4 and 4'. The liquid crystal may be of any type as long as the optical characteristic changes in response to the electric field induced therein, for example, a guest-host type, birefringent type or so on. In this embodiment, however, a ferroelectric liquid crystal is employed which has a large angle of visibility. In accordance with electric field in the liquid crystal layer, light incident on the layer is selectively allowed to pass therethrough. One of the electrode strips may be reflective so that the device functions as a reflective type device, and for this type the underlying substrate may not be transparent.

On the electrode 3 is a first dielectric film 1 and a floating electrode 6 in the form of a semiconductor layer or clusters where a capacitance is formed inbetween. Further a second dielectric film 2 is formed on the floating electrode 6. The floating electrode 6 and the electrode strips 3' form another capacitance inbetween. Reference numeral 7 designates an oriented film.

Figure 2:
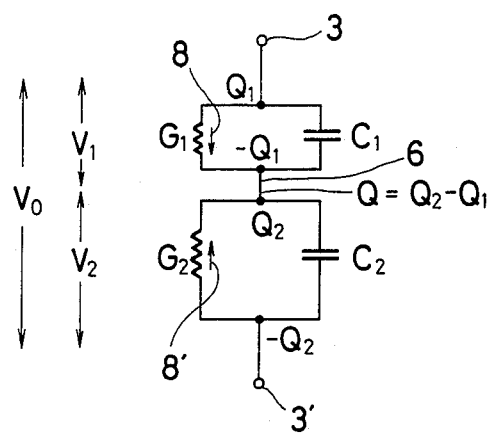
FIG. 2 is an equivalent circuit diagram of the embodiment shown in FIG. 1

The electric characteristics of the device illustrated in FIG. 1 can be examined with an equivalent circuit as shown in FIG. 2 in which $G_2$ and $C_2$ are the conductance and the capacitance of the FLC layer 5 accompanied by the second dielectric film 2 respectively and $G_1$ and $C_1$ are the conductance and the capacitance of the first dielectric film 1. The semiconductor layer or clusters 6 functions as a charge trapping center. When a voltage $V_0$ is applied to the circuit through a pair of electrodes 3 and 3', the voltage $V_1$ across $C_1$ or $G_1$ and the charge $Q_1$ accumulated on the first dielectric film 1, and the voltage $V_2$ across $C_2$ or $G_2$ and the charge $Q_2$ accumulated on the liquid crystal layer 5, are calculated in the form:

$$V_0 = V_1 + V_2, V_1 = Q_1/C_1 = V_0 C_2/(C_1+C_2),$$

$$V_2 = Q_2/C_2 = V_0 C_1/(C_1+C_2).$$

Practically, the thickness of the first dielectric film 1 is several angstroms and the thickness of the FLC layer is 2 to 3 Å, and $C_1$ is therefore substantially larger than $C_2$. Thus $V_2 \approx 0$ is established and almost all the voltage applied to the device is applied to the FLC layer at the initial stage.

Into the floating electrode 6 are introduced currents 8 and 8' through the conductance $G_1$ and $G_2$ in accordance with this divided voltages $V_1$ and $V_2$. The current 8 and 8' flow in the opposed directions and the electric charge due to the differential current therebetween is accumulated on the floating electrode 6 with time.

The charge Q accumulated on the floating electrode 6 is calculated from the equation, $$Q = V_0(C_2 G_1 - C_1 G_2)/(G_1 + G_2) \times [1 - exp(-t(G_1 + G_2)/(C_1+C_2))].$$

In virture of the relation, $C_1 > C_2$, the conductance of the liquid crystal layer 5 is of the order of $10^9$ ohms when the thickness is 2 microns and the one pixel dimension is 300 microns $\times$ 300 microns. The conductance is reduced to the order of $10^5$ to $10^6$ under electric field application because of the non-linearity of the second dielectric film with the thickness of the order of 10 to 100Å, 20Å for example. On the other hand, the first dielectric film is of $10^{12}$ ohms under the same condition as the second dielectric film and thereby the resistance is sufficiently large as compared with $G_1$. Then, the above general equation can be simplified as;

$$Q = -C_1 V_0[1 - exp(-G_2 t/C_1)] = Q_2 - Q_1.$$

$$Q_1 = Q_2 + C_1 V_0[1 - exp(-G_2 t/C_1)] = C_1 V_1.$$

$$Q_1 = C_2 V_2 + C_1 V_0[1 - exp(-G_2 t/C_1)] = C_1(V_0 - V_2).$$

These equations can be rearranged into $$V_1(C_1+C_2) = C_2 V_0 + C_1 V_0 - C_1 V_0[1 - exp(-G_2 t/C_1)],$$

$$V_1 = V_0 - C_1 V_0 exp(-G_2 t/C_1)/(C_1-C_2).$$

Namely, after a sufficient time or with a sufficient large $G_2$, the voltage $V_2$ across the liquid crystal layer is given by $$V_2 = C_1 V_0(C_1-C_2).$$

The voltage accounts for the charge trapped by the semiconductor layer or clusters as a trapping center and therefore is not dissipated even after removal of the applied voltage. The condition of the liquid crystal layer also remained as it was due to the electric field induced by the trapped charges. Hence the transparent or opaque conditions of the liquid crystal layer are non-volatile.

It is for this reason that the device according to the invention has an apparent Ec even if the liquid crystal layer itself has not a sufficient Ec. The Ec is varied with the amount of the charge accumulated on the floating electrode. By controlling the amount of the charge on the floating electrode, it is possible to make the Ec certain at a comparatively large value.

Experiment 1:

This description is made also in conjunction with FIG. 1. On the glass substrates 4 and 4' were transparent electrodes made of indium tin oxide (ITO). The first dielectric film 1 on the electrode 3 was made from silicon nitride by plasma CVD or photo CVD such as disclosed in Japanese Patent Published Application No. sho59-079623 filed on 4/20/1984 by the applicant, especially by the first, second and fourth embodiments described in the Japanese Application. In the method a silicon nitride film was deposited with 500 Å in thickness on the electrode 3 in a reaction chamber under a processing pressure of 0.1 torr and at a temperature of 350° C. using a mixed process gas composed of silane($Si_n H_{2n+2}: n \geq 1$) and ammonia or nitrogen at a rate of ammonia/silane $\geq$ 50 with electric power of high frequency, 13.56 MHz.

After the deposition of the first dielectric film 1, the reaction chamber was further evacuated to less than $10^{-6}$ torr. Then, a silicon semiconductor layer or clusters were deposited by silane gas introduced at 200 cc/min with high frequency electric field of 13.56 MHz at 350° C.

The silicon semiconductor was deposited in the form of clusters when the average thickness was less than 100 Å and deposited in the form of a layer when the average thickness was in a range between 100 to 1000 Å. With more than 1000 Å in thickness of the semiconductor layer, light transmissivity of the semiconductor layer was degraded and not suitable for optical devices. According to this experiment the most suitable thickness was 1000 Å.

Further, after exhaustion of the reaction chamber, the second dielectric film 2 was deposited 10 to 100 Å, for example 30 Å by a method which is almost same, beside the pressure being 0.01 torr, as that of the first dielectric film 1.

On the transparent electrode 3' were also formed a silicon nitride film 11 with 300 Å in average thickness by the same method. The silicon nitride film 11 functions to prevent such impurity as sodium ions from entering into the liquid crystal layer 5 from the glass substrate or the transparent electrode 3'. Thereafter a oriented film 7 was prepared on the inside surface of the nitride film 11 contiguous to the liquid crytstal layer 5. The oriented film 7 was spread over the surface with a spinner and dried by heating at 120° for 30 minutes, and the inside of the film 7 was oriented by rubbing.

Next, the substrates 4 and 4' thus provided with the oriented film are joined and the perimeter thereof is sealed off, and then liquid crystal is injected to the space formed between the opposed substrates 4 and 4'. The liquid crystal is a blend of F8 and B7. As another liquid crystal, a blend of OMOOPP and MBRA can be used also. Other suitable liquid crystals are disclosed in Japanese Published Applications Nos. sho56-107216, sho59-98051 and sho59-118744.

Figure 3:
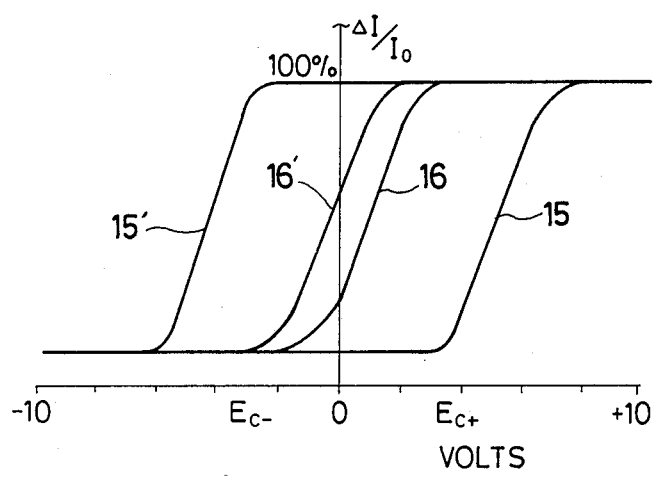
FIG. 3 is a graphical diagram showing the hysteresis loop of the embodiment shown in FIG. 1 and the hysteresis loop of a prior art device.

In response to the electric voltages of ±10 V applied to each pixel, the FEC layer demonstrated an apparent Ec. FIG. 3 is a graphical diagram showing the hysteresis of the liquid crystal device according to the invention. The abscissa is the applied voltage and the ordinate is the transparency of the liquid crystal layer. In the figure, curves 16 and 16' represent a hysteresis loop of a conventional device in which only silane coupling agent was used. The Ec was not only very slight as shown in the figure but also very unstable. On the contrary, according to the invention, a well-formed hysteresis loop was plotted as shown with curves 15 and 15' and the Ec was comparatively large.

In what follow are descriptions for other experiments. There were used many same processing steps in the experiments as the corresponding steps of this first experiment described above, so that it should be regarded as omission avoiding redundant description when some steps are not elaborated in the following description.

Figure 4A:
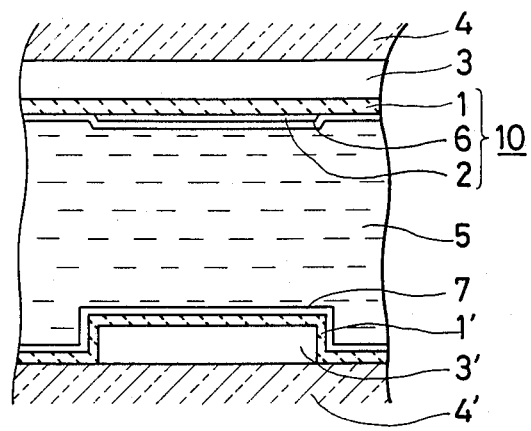
FIGS. 4(A) through 4(D) are sectional views showing modifications of a device in accordance with the present invention.

Experiment 2:

The first dielectric film 1 was deposited from silicon nitride with 500 to 2000 Å in thickness as shown in FIG. 4(A). The floating electrode 6 was made from silicon with 100 to 1000 Å and patterned to locate only above the electrode 3 and covered with a silicon nitride film of 20 to 100 Å thickness. On the electrode 3' was formed a silicon nitride film 5' and an organic oriented film 7. In this structure electric charge was to be entered to the floating electrode 6 from the liquid crystal layer 5.

Figure 4B:
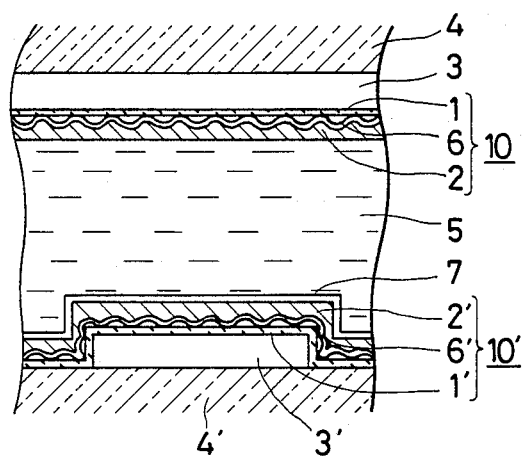

Experiment 3:

Unlike the previous experiment the first dielectric film 1 was deposited with a greater thickness of 500 to 2000 Å to receive electric charge from the electrode 3 as shown in FIG. 4(B). A floating electrode 6' was formed also on the opposed substrate 3' together with a second dielectric film 2'. The floating electrodes 6 and 6' were made from silicon cluster with 50 Å in average thickness. Accordingly the sense of the hysteresis loop was inversed as compared with the above experiments.

Figure 4C:
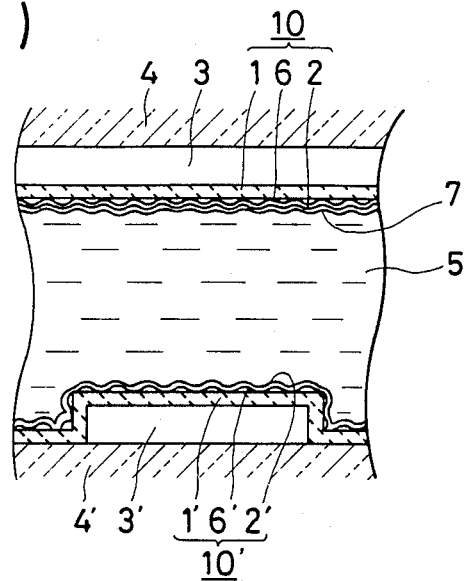

Experiment 4:

This device was a type where electric charge is to enter the floating electrodes 6 and 6' made of silicon clusters from the liquid crystal layer 5 as shown in FIG. 4(C). By this structure the Ec was further enhanced.

Figure 4D:
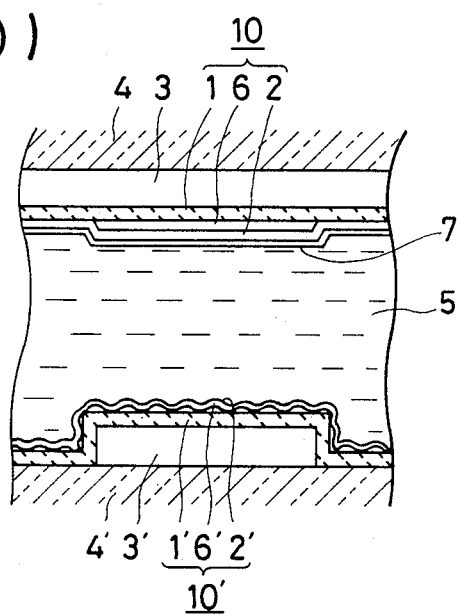

Experiment 5:

The floating electrode 6 was deposited in the form of a thin film while the other floating electrode was deposited in the form of clusters as shown in FIG. 4(D)

Although the above description has been made in conjunction with particular embodiments, the invention shall not be limited thereto but limited only to the appending claims, and many modifications may be considered as follow:

The semiconductor layer or clusters may be $Si_x$-$Ge_{1-x}(0 \leq x \leq 1)$ which may be doped with such dopant as phosphine or boron or hydrogen or a halogen.

According to the gist of the invention, the charge storage region can be constituted with any material as long as it can store electric charge therein behind an insulator. For example, a metal such as Pt, Mo, Ta, Al, In or Sn, or a metallic compound thereof, or an alloy including silicon alloys and gerumanium alloys.

Silicon nitride is used in the above embodiment to form dielectric film. However, other material can be used, for example, silicon oxide, aluminium oxide, tantalum oxide, phosphorous glass, boro-silicate glass, an organic dielectric material or so on.

In place of rubbing method to orient inside of the substrate, other orientation method can be employed, for example a temperature graduation method, a shearing method and so on. The shearing method is carried out by making a displacement of a pair of substrate between which a liquid crystal layer is disposed.

The semiconductor layer or clusters can be formed on either one of opposed inside of substrates, or both opposed insides. Further a ferroelectric film may cover throughout the inside of a substrate, may cover only electrodes or may cover only pixels.

The invention can be applied also to speakers, printers, disc memory or other smectic liquid crystal appliances.

What is claimed is:

1. A liquid crystal device comprising:
   a pair of substrates; said substrates being in a spaced, substantially parallel relationship;
   a ferroelectric liquid crystal layer interposed between said substrates, said layer having optical characteristic changes in response to an electric field induced therein;
   an electrode arrangement, said electrode arrangement constructed to define pixels of said device in matrix form and to induce an electric field perpendicular to said pair of substrates and across said liquid crystal layer at a particular pixel; and
   a charge storage lever adjacent to the interior surface of at least one of said pair of substrates and overlying each pixel and positioned to be subjected to the electric field along with said liquid crystal layer, said charge storage layer being provided an electric charge when said electric field is induced so that bistability of said ferroelectric liquid crvstal layer is enhanced.

2. A device of claim 1 wherein said charge storage layer is made of a semiconductor.

3. A device of claim 2 wherein said semiconductor is made from silicon semiconductor.

4. A device of claim 2 wherein said semiconductor region is made form gerumanium semiconductor.

5. A device of claim 1 wherein said charge storage layer is made of a metal.

6. A device of claim 3 wherein said metal is selected from a group consisting of Pt, Mo, Ta, Al, In and Sn.

7. A device of claim 1 wherein said charge storage layer is made of a metallic compound.

8. A device of claim 4 wherein said metallic compound is a metal silicide.

9. A device of claim 1 wherein said charge storage layer is made of a gerumanium compound.

10. A device of claim 1 wherein the configuration of charge storage layer is a plurality of clusters.

11. A device of claim 1 further comprising a first insulator film disposed between said charge storage layer and said liquid crystal layer.

12. A device of claim 1 where said charge storage layer includes a second insulator and where the conductances of said first and second insulators are such that electric charge drifts into said charge storage layer through only one of said insulators.

13. A device of claim 1 where said charge storage area overlies a substantial portion of the area of each pixel.

14. A device of claim 1 where said charge storage area includes a dielectric layer.

* * * * *